United States Patent
De Lagrange et al.

(10) Patent No.: US 12,309,357 B2
(45) Date of Patent: May 20, 2025

(54) CODING MODE INFORMATION PROPAGATION FOR VIDEO CODING

(71) Applicant: INTERDIGITAL CE PATENT HOLDINGS, SAS, Paris (FR)

(72) Inventors: Philippe De Lagrange, Betton (FR); Franck Galpin, Thorigne-Foulliard (FR); Fabrice Leleannec, Betton (FR); Karam Naser, Mouaze (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 84 days.

(21) Appl. No.: 17/761,079

(22) PCT Filed: Sep. 7, 2020

(86) PCT No.: PCT/EP2020/074903
§ 371 (c)(1),
(2) Date: Mar. 16, 2022

(87) PCT Pub. No.: WO2021/052792
PCT Pub. Date: Mar. 25, 2021

(65) Prior Publication Data
US 2022/0345693 A1    Oct. 27, 2022

(30) Foreign Application Priority Data
Sep. 20, 2019   (EP) .................................... 19306142

(51) Int. Cl.
*H04N 19/105*   (2014.01)
*H04N 19/176*   (2014.01)
(52) U.S. Cl.
CPC ......... *H04N 19/105* (2014.11); *H04N 19/176* (2014.11)

(58) Field of Classification Search
CPC .......................... H04N 19/105; H04N 19/176
(Continued)

(56) References Cited

U.S. PATENT DOCUMENTS 10,931,954 B2 *   2/2021   Cheong ................ H04N 19/103
11,006,106 B2 *   5/2021   Liu ....................... H04N 19/184
(Continued)

FOREIGN PATENT DOCUMENTS

CN    105874795 A    8/2016
CN    107079161 A    8/2017
(Continued)

OTHER PUBLICATIONS

Anonymous, "Versatile Video Coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.266, Aug. 2020, 516 pages.
(Continued)

*Primary Examiner* — Albert Kir
(74) *Attorney, Agent, or Firm* — Condo Roccia Koptiw LLP

(57) ABSTRACT

Coding mode information of a current block is propagated to neighbor blocks even when the coding mode is not selected for a current block. Such propagation may be limited, for example to one block only or to multiple generation of copies. Different propagation modes are proposed: left to right direction, top to bottom direction, bottom-right diagonal direction, first available information, or last coded information. The coding mode propagation allows to improve further predictions since a further block will benefit from the information from its neighbors.

19 Claims, 9 Drawing Sheets

(58) Field of Classification Search
USPC .................................................. 375/240.02
See application file for complete search history.

(56) References Cited

U.S. PATENT DOCUMENTS

| | | | |
|---|---|---|---|
| 11,595,658 B2* | 2/2023 | Wang | H04N 19/51 |
| 2011/0038416 A1 | 2/2011 | Zhou et al. | |
| 2017/0238001 A1 | 8/2017 | Li et al. | |
| 2017/0280159 A1 | 9/2017 | Xu et al. | |
| 2018/0278942 A1* | 9/2018 | Zhang | H04N 19/139 |
| 2019/0182496 A1 | 6/2019 | Xu et al. | |
| 2020/0120336 A1 | 4/2020 | Racape et al. | |
| 2020/0304780 A1* | 9/2020 | Li | H04N 19/176 |
| 2021/0227209 A1* | 7/2021 | Liu | H04N 19/96 |
| 2021/0344969 A1* | 11/2021 | Zhang | H04N 19/139 |
| 2023/0115768 A1* | 4/2023 | Liao | H04N 19/139 375/240.02 |
| 2023/0117813 A1* | 4/2023 | Deng | H04N 19/176 |

FOREIGN PATENT DOCUMENTS

| | | | | |
|---|---|---|---|---|
| CN | 110915212 A | 3/2020 | | |
| EP | 3468193 A1 | 4/2019 | | |
| WO | WO-2010086562 A1 * | 8/2010 | | H04N 19/105 |
| WO | 2019070933 A1 | 4/2019 | | |
| WO | WO-2020055169 A1 * | 3/2020 | | H04N 19/105 |

OTHER PUBLICATIONS

Anonymous, "Advanced Video Coding for Generic Audiovisual Services", International Telecommunication Union, ITU-T Telecommunication Standardization Sector of ITU, Series H: Audiovisual and Multimedia Systems, Infrastructure of audiovisual services—Coding of moving video, Recommendation ITU-T H.264, Jan. 2012, 680 pages.

Anonymous, "Reference software for ITU-T H.265 high efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265.2, Oct. 2014, 12 pages.

Bross et al., "Versatile Video Coding (Draft 6)", Joint Video Experts Team (JVET) of ITU-T SG 16 WP 3 and ISO/IEC JTC 1/SC 29/WG 11, Document: JVET-O2001-vE, 15th Meeting, Gothenburg, Sweden, Jul. 3, 2019, 455 pages.

Li et al., "History-Based Motion Vector Prediction for Future Video Coding", Institute of Electrical and Electronics Engineering (IEEE), 2019 IEEE International Conference on Multimedia and Expo (ICME), Shanghai, China, Jul. 8, 2019, 6 pages.

Wang, et al., "CE3-related: A unitifed MPM list for intra mode coding", JVET-N0185-r1, Joint Video Experts Team (JVET) of ITU-T SG 16 WP 3 and ISO/IEC JTC 1/SC 29/WG 11, 14th Meeting: Geneva, CH, Mar. 19-27, 2019, 3 pages.

* cited by examiner

CODING MODE INFORMATION PROPAGATION FOR VIDEO CODING

CROSS REFERENCE TO RELATED APPLICATIONS

This application is a U.S. National Stage Application under 35 U.S.C. 371 of International Patent Application No. PCT/EP2020/074903, filed Sep. 7, 2020, which is incorporated herein by reference in its entirety.

This application claims the benefit of European Patent Application No. 19306142, filed Sep. 20, 2019, which is incorporated herein by reference in its entirety.

TECHNICAL FIELD

At least one of the present embodiments generally relates to the selection of modes for video encoding or decoding and more particularly to the propagation of coding mode to a further block.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

In at least one embodiment, the coding mode information of a current block is propagated to neighbor blocks even when the coding mode is not selected for a current block. This propagation may be limited. Different propagation modes are proposed. Information related to the coding mode depend on the coding mode itself. The coding mode propagation allows to improve further predictions since a further block will benefit from the information from its neighbor.

DETAILED DESCRIPTION

The present aspects, although describing principles related to particular drafts of VVC (Versatile Video Coding) or to HEVC (High Efficiency Video Coding) specifications, are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Figure 1:
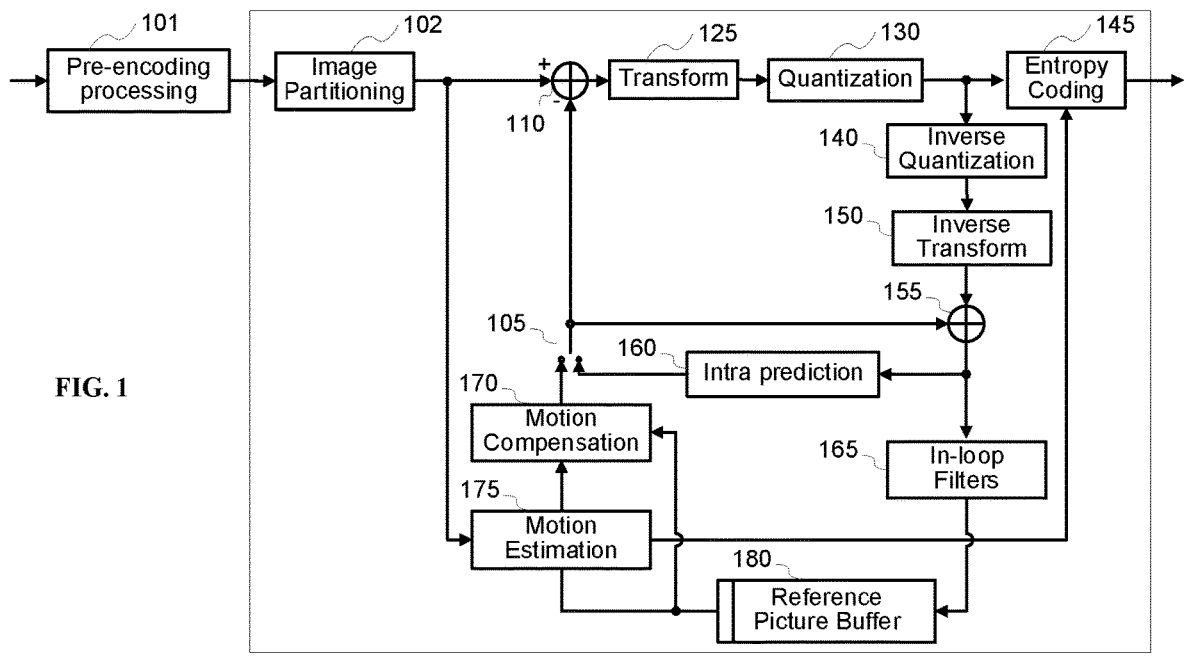
FIG. 1 illustrates a block diagram of an example of video encoder 100, such as a High Efficiency Video Coding (HEVC) encoder.

FIG. 1 illustrates block diagram of an example of video encoder 100, such as a HEVC encoder. FIG. 1 may also illustrate an encoder in which improvements are made to the HEVC standard or an encoder employing technologies similar to HEVC, such as a JEM (Joint Exploration Model) encoder under development by JVET (Joint Video Exploration Team) for VVC.

Before being encoded, the video sequence can go through pre-encoding processing (101). This is for example performed by applying a color transform to the input color picture (for example, conversion from RGB 4:4:4 to YCbCr 4:2:0) or performing a remapping of the input picture components in order to get a signal distribution more resilient to compression (for instance using a histogram equalization of one of the color components). Metadata can be associated with the pre-processing and attached to the bitstream.

In HEVC, to encode a video sequence with one or more pictures, a picture is partitioned (102) into one or more slices where each slice can include one or more slice segments. A slice segment is organized into coding units, prediction units, and transform units. The HEVC specification distinguishes between "blocks" and "units," where a "block" addresses a specific area in a sample array (for example, luma, Y), and the "unit" includes the collocated blocks of all encoded color components (Y, Cb, Cr, or monochrome), syntax elements, and prediction data that are associated with the blocks (for example, motion vectors).

Figure 4A:
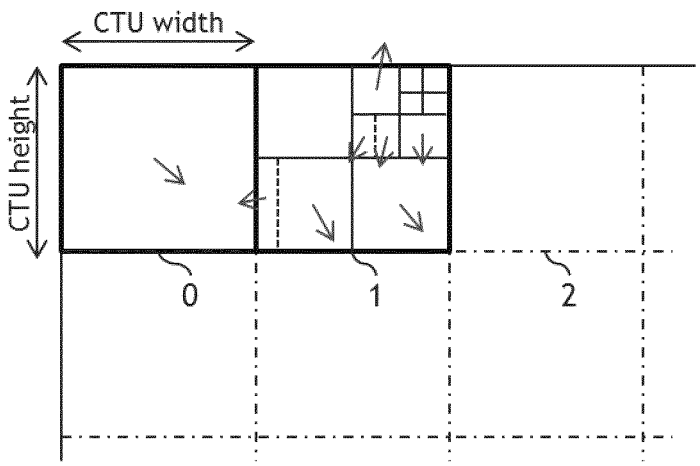
FIG. 4A illustrates an example of coding tree unit and coding tree in the compressed domain.
Figure 4B:
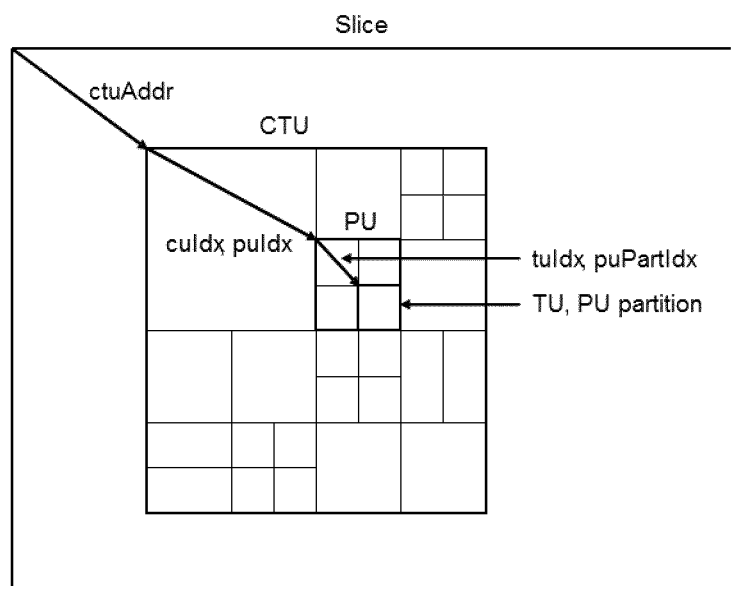
FIG. 4B illustrates an example of division of a CTU into coding units, prediction units and transform units.

For coding in HEVC, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes. Such blocks are illustrated in FIG. 4A and FIG. 4B.

In the example of encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar, and 33 angular prediction modes. The intra prediction reference is reconstructed from the row and column adjacent to the current block. The reference extends over two times the block size in the horizontal and vertical directions using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (for example, motion vector and reference picture index) can be signaled using different methods, for example, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

The prediction residuals are then transformed (125) and quantized (130), including at least one embodiment for adapting the chroma quantization parameter described below. The transforms are generally based on separable transforms. For instance, a DCT transform is first applied in the horizontal direction, then in the vertical direction. In recent codecs such as the JEM, the transforms used in both directions may differ (for example, DCT in one direction, DST in the other one), which leads to a wide variety of 2D transforms, while in previous codecs, the variety of 2D transforms for a given block size is usually limited.

The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, that is, the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
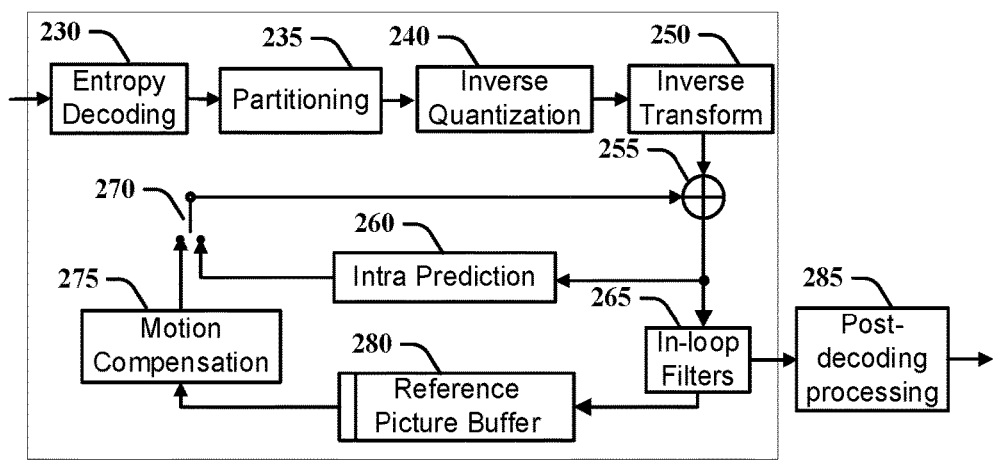
FIG. 2 illustrates a block diagram of an example of video decoder 200, such as an HEVC decoder.

FIG. 2 illustrates a block diagram of an example of video decoder 200, such as an HEVC decoder. In the example of decoder 200, a bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a JEM decoder.

In particular, the input of the decoder includes a video bitstream, which may be generated by video encoder 100. The bitstream is first entropy decoded (230) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. The transform coefficients are de-quantized (240) including at least one embodiment for adapting the chroma quantization parameter described below and inverse transformed (250) to decode the prediction residuals.

Combining (255) the decoded prediction residuals and the predicted block, an image block is reconstructed. The predicted block may be obtained (270) from intra prediction (260) or motion-compensated prediction (that is, inter prediction) (275). As described above, different mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

The decoded picture can further go through post-decoding processing (285), for example, an inverse color transform (for example conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

Figure 3:
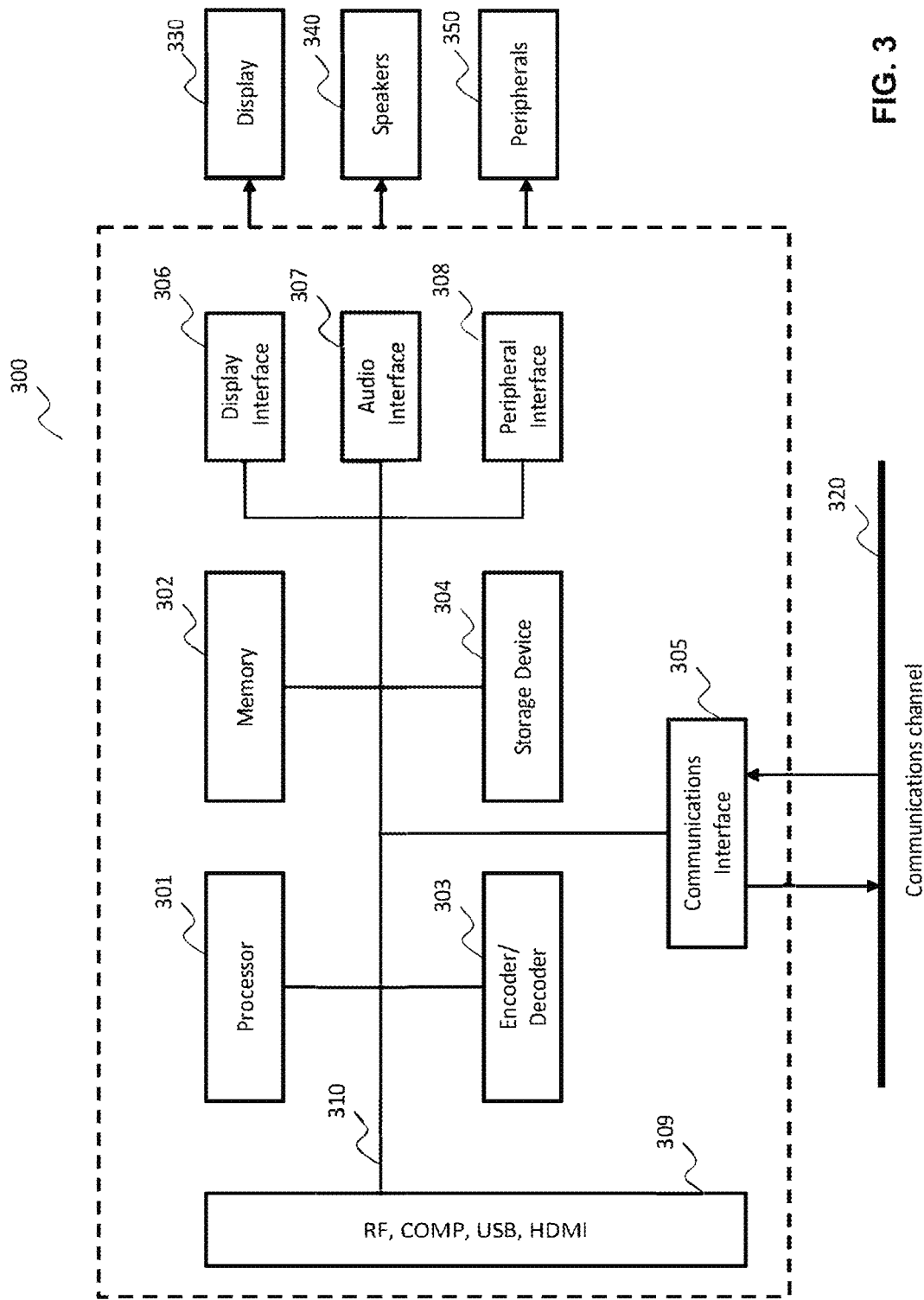
FIG. 3 illustrates a block diagram of an example of a system in which various aspects and embodiments are implemented.

FIG. 3 illustrates a block diagram of an example of a system in which various aspects and embodiments are implemented. System 300 can be embodied as a device including the various components described below and is configured to perform one or more of the aspects described in this application. Examples of such devices include, but are not limited to, various electronic devices such as personal computers, laptop computers, smartphones, tablet computers, digital multimedia set top boxes, digital television receivers, personal video recording systems, connected home appliances, encoders, transcoders, and servers. Elements of system 300, singly or in combination, can be embodied in a single integrated circuit, multiple ICs, and/or discrete components. For example, in at least one embodiment, the processing and encoder/decoder elements of system 300 are distributed across multiple ICs and/or discrete components. In various embodiments, the elements of system 300 are communicatively coupled through an internal bus 310. In various embodiments, the system 300 is communicatively coupled to other similar systems, or to other electronic devices, via, for example, a communications bus or through dedicated input and/or output ports. In various embodiments, the system 300 is configured to implement one or more of the aspects described in this document, such as the video encoder 100 and video decoder 200 described above and modified as described below.

The system 300 includes at least one processor 301 configured to execute instructions loaded therein for implementing, for example, the various aspects described in this document. Processor 301 can include embedded memory, input output interface, and various other circuitries as known in the art. The system 300 includes at least one memory 302 (e.g., a volatile memory device, and/or a non-volatile memory device). System 300 includes a storage device 304, which can include non-volatile memory and/or volatile memory, including, but not limited to, EEPROM, ROM, PROM, RAM, DRAM, SRAM, flash, magnetic disk drive, and/or optical disk drive. The storage device 304 can include an internal storage device, an attached storage device, and/or a network accessible storage device, as non-limiting examples.

System 300 includes an encoder/decoder module 303 configured, for example, to process data to provide an encoded video or decoded video, and the encoder/decoder module 303 can include its own processor and memory. The encoder/decoder module 303 represents module(s) that can be included in a device to perform the encoding and/or decoding functions. As is known, a device can include one or both of the encoding and decoding modules. Additionally, encoder/decoder module 303 can be implemented as a separate element of system 300 or can be incorporated within processor 301 as a combination of hardware and software as known to those skilled in the art.

Program code to be loaded onto processor 301 or encoder/decoder 303 to perform the various aspects described in this document can be stored in storage device 304 and subsequently loaded onto memory 302 for execution by processor 301. In accordance with various embodiments, one or more of processor 301, memory 302, storage device 304, and encoder/decoder module 303 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 301 and/or the encoder/decoder module 303 is used to store instructions and to provide working memory for processing that is needed during encoding or decoding. In other embodiments, however, a memory external to the processing device (for example, the processing device can be either the processor 301 or the encoder/decoder module 303) is used for one or more of these functions. The external memory can be the memory 302 and/or the storage device 304, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 300 can be provided through various input devices as indicated in block 309. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 309 have associated respective input processing elements as known in the art. For example, the RF portion can be associated with elements necessary for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 300 to other electronic devices across USB and/or HDMI connections. It is to be understood that various aspects of input processing, for example, Reed-Solomon error correction, can be implemented, for example, within a separate input processing IC or within processor 301 as necessary. Similarly, aspects of USB or HDMI interface processing can be implemented within separate interface ICs or within processor 301 as necessary. The demodulated, error corrected, and demultiplexed stream is provided to various processing elements, including, for example, processor 301, and encoder/decoder 303 operating in combination with the memory and storage elements to process the datastream as necessary for presentation on an output device.

Various elements of system 300 can be provided within an integrated housing, Within the integrated housing, the various elements can be interconnected and transmit data therebetween using suitable connection arrangement, for example, an internal bus as known in the art, including the I2C bus, wiring, and printed circuit boards.

The system 300 includes communication interface 305 that enables communication with other devices via communication channel 320. The communication interface 305 can include, but is not limited to, a transceiver configured to transmit and to receive data over communication channel 320. The communication interface 305 can include, but is not limited to, a modem or network card and the communication channel 320 can be implemented, for example, within a wired and/or a wireless medium.

Data is streamed to the system 300, in various embodiments, using a Wi-Fi network such as IEEE 802.11. The Wi-Fi signal of these embodiments is received over the communications channel 320 and the communications interface 305 which are adapted for Wi-Fi communications. The communications channel 320 of these embodiments is typically connected to an access point or router that provides access to outside networks including the Internet for allowing streaming applications and other over-the-top communications. Other embodiments provide streamed data to the system 300 using a set-top box that delivers the data over the HDMI connection of the input block 309. Still other embodiments provide streamed data to the system 300 using the RF connection of the input block 309.

The system 300 can provide an output signal to various output devices, including a display 330, speakers 340, and other peripheral devices 350. The other peripheral devices 350 include, in various examples of embodiments, one or more of a stand-alone DVR, a disk player, a stereo system, a lighting system, and other devices that provide a function based on the output of the system 300. In various embodiments, control signals are communicated between the system 300 and the display 330, speakers 340, or other peripheral devices 350 using signaling such as AV.Link, CEC, or other communications protocols that enable device-to-device control with or without user intervention. The output devices can be communicatively coupled to system 300 via dedicated connections through respective interfaces 306, 307, and 308. Alternatively, the output devices can be connected to system 300 using the communications channel 320 via the communications interface 305. The display 330 and speakers 340 can be integrated in a single unit with the other components of system 300 in an electronic device such as, for example, a television. In various embodiments, the display interface 306 includes a display driver, such as, for example, a timing controller (T Con) chip.

The display 330 and speaker 340 can alternatively be separate from one or more of the other components, for example, if the RF portion of input 309 is part of a separate set-top box. In various embodiments in which the display 330 and speakers 340 are external components, the output signal can be provided via dedicated output connections, including, for example, HDMI ports, USB ports, or COMP outputs. The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

FIG. 4A illustrates an example of coding tree unit and coding tree in the compressed domain. In the HEVC video compression standard, motion compensated temporal prediction is employed to exploit the redundancy that exists between successive pictures of a video. To do so, a picture is partitioned into so-called Coding Tree Units (CTU), which size is typically 64×64, 128×128, or 256×256 pixels. Each CTU is represented by a Coding Tree in the compressed domain, for example in a quad-tree division of the CTU. Each leaf is called a Coding Unit (CU).

FIG. 4B illustrates an example of division of a CTU into coding units, prediction units and transform units. Each CU is then given some Intra or Inter prediction parameters Prediction Info). To do so, it is spatially partitioned into one or more Prediction Units (PUs), each PU being assigned some prediction information comprising such as a motion vector. The Intra or Inter coding mode is assigned on the CU level.

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side. The term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of numerous sizes.

In recent video codecs, such as VTM draft 6 for example, in addition to the usual translational motion model, a CU can contain sub-block motion (e.g. 4×4 square sub-block) using common parametric motion model (for example affine mode) or using temporally propagated motion vectors (for example subblock-based temporal motion vector prediction (SbTMVP) also known as ATMVP)

Figure 5:
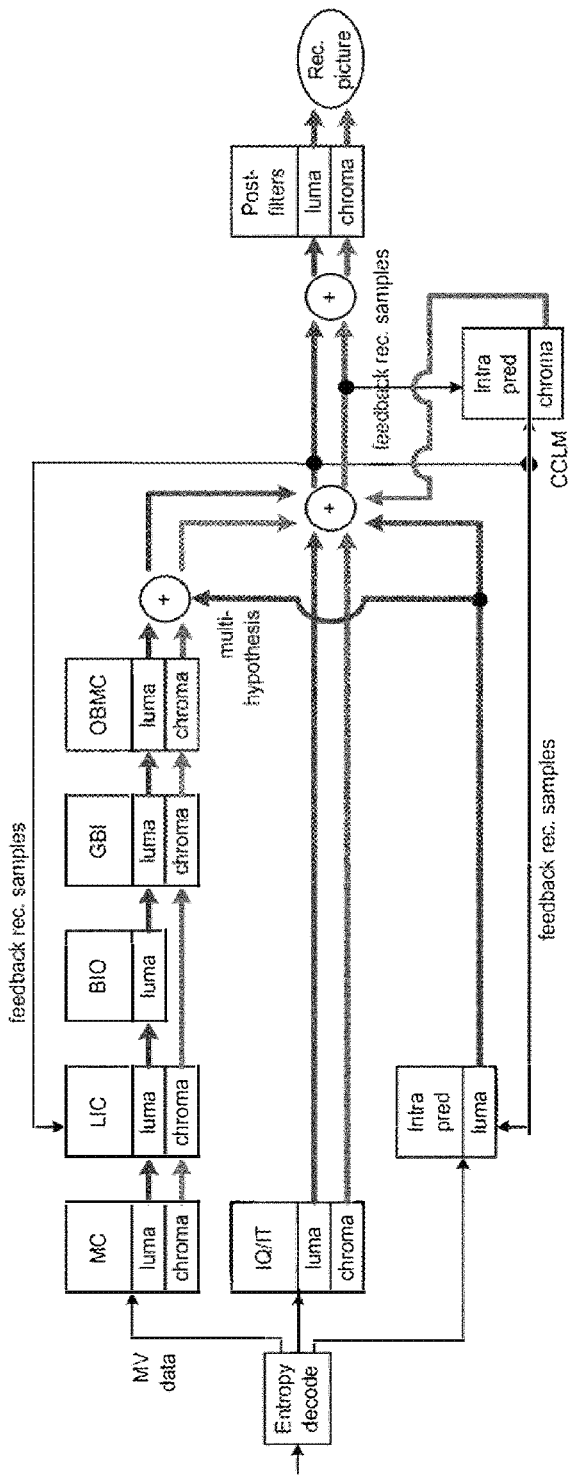
FIG. 5 illustrates an example of pipeline to construct a block in a full-staged video codec.

FIG. 5 illustrates an example of pipeline to construct a block in a full-staged video codec. Some of the stages can be by-passed or not present in some versions of video codecs. Regarding the decoding of inter-predicted block, the following processes might be needed:

MC (motion compensation) can be done either by block or sub-block.

LIC (Local Illumination compensation) changes the predicted samples values using a linear adaptation.

BIO or BDOF (bi-prediction optical flow) changes the predicted samples values using the result of an optical flow estimation between the 2 reference blocks used to reconstruct the block.

DMVR (decoder-side motion vector refinement, not shown in FIG. 5) refines the motion vectors inside a PU at decoder side for bi-directional prediction.

GBI (Generalized bi-prediction) aka BCW (bi-prediction with CU weights) uses a weighted average of the 2 reference blocks used to reconstruct the block.

OBMC (overlapped block motion compensation) performs a weighted average of motion compensated blocks using different motion vectors from neighboring blocks.

IQ/IT (inverse quantization and inverse transform) are used to reconstruct a residual.

Intra prediction is used to predict a block using surrounding samples values

CIIP (Combined Inter/Intra prediction) or Multi-hypothesis merges together several predictions (typically inter and intra) using a weighted average depending on the position.

CCLM: Cross Components Linear Model. Use another already reconstructed component to predict the current component using a linear model.

CU decoding comprises different tools such as MIP (aka ALWP): Matrix based Intra Prediction, Affine: affine motion model (4 or 6 parameters), ISP (Intra Sub Partitions), SBT (Sub Block Transform), MRL (Multi Reference Line), Triangle (triangle based partitioning), CIIP (combined intra/inter prediction), IBC (Intra Block Copy). These tools may have specific parameters.

When a particular mode is selected for a block, then the block will only contain information related to this mode. For example, when a block is intra coded, then it will only contain intra related information such as intra directions, MIP on/off, MRL on/off, etc. In a given region, when an isolated block is using a mode different from the rest of the blocks of the region, then the propagation of information for blocks next to this block is stopped. In such cases, the prediction of the mode for further blocks is not efficient and compression performance might be reduced.

The present document describes multiple embodiments that have been conceived with the foregoing in mind. Various methods and other aspects described in this application can be performed by the processor 301 of a device 300 (FIG. 3) implementing a video encoder 100 (FIG. 1) or a video decoder 200 (FIG. 2).

In at least one embodiment, the coding mode information of a current block is propagated to neighbor blocks even when the coding mode is not selected for a current block. In at least one embodiment, such propagation is limited, for example to one block only or to multiple generations of copies. Different propagation modes are proposed: left to right direction, top to bottom direction, bottom-right diagonal direction, first available, last coded.

Information related to the coding mode depend on the coding mode itself. For example, for an INTER coding mode, the coding mode information may comprise a motion vector, a reference index of a reference picture in the reference list and a mode between selected from unidirectional or bi-directional. Other modes use other coding mode information.

The coding mode propagation allows to improve further predictions since a further block will benefit from the information from its neighbor. Indeed, when there is a sporadic mode change for a block (typically when only 1 block has a different coding mode in a given region), it will completely or partially stop the information propagation for the blocks adjacent to this block.

The coding mode propagation can be performed both at encoding stage by the encoder 100 of FIG. 1 and at decoding stage by the decoder 200 of FIG. 2. More particularly, the coding mode propagation can be implemented by the encoder/decoder module or the processor of device 300 of FIG. 3.

Figure 6:
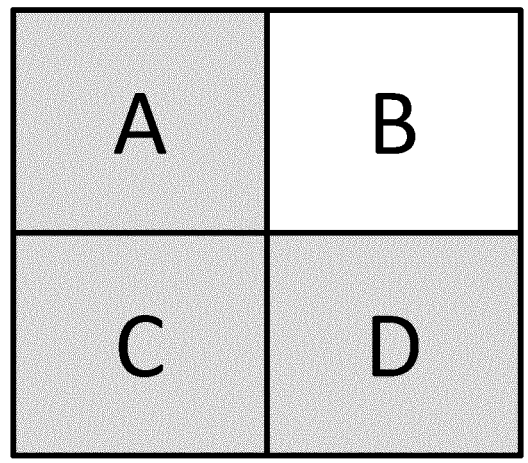
FIG. 6 illustrates a simple example of block partition.

FIG. 6 illustrates a simple example of block partition. In this example, blocks A, C and D use a common coding mode M, whereas the block B uses another coding mode N. For example, the mode M is merge coded block (that is the block is an inter coded block, using the regular merge mode with an associated motion vector), whereas mode N is intra coded mode (with an associated intra direction).

Figure 7A:
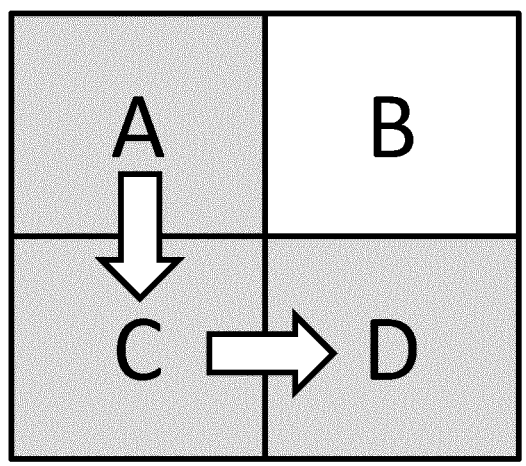
FIG. 7A illustrates the coding mode propagation within the block partitions in a conventional implementation.

FIG. 7A illustrates the coding mode propagation within the block partitions in a conventional implementation. In such case, the following propagation takes place:

Block B cannot use information from left block (block A) since their modes are different Block C uses information from top block (block A) since their modes are similar Block D cannot used information from top block (block B) since their modes are different, but can use information from left block (block C)

In at least one embodiment, it is proposed, for a given block, to store information from a neighboring block, regardless of the coding mode of the current block. For example, information of the left block is always carried on the current block for information which are not related to the current block coding mode. In such implementation, in the example of FIG. 7, the block B will copy information from block A (thus related to a regular merge mode) without using them since the modes are different. Indeed, since block B uses intra coding, it has no use for merge mode parameters.

Figure 7B:
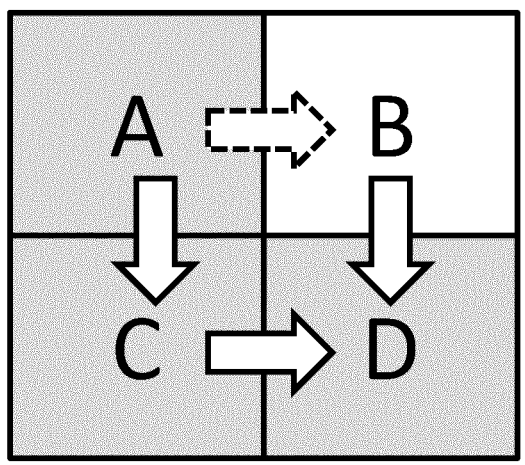
FIG. 7B illustrates an example embodiment where information related to the coding mode of a current block is propagated to neighbor blocks on the right and on the bottom.

FIG. 7B illustrates an example embodiment where information related to the coding mode of a current block is propagated to neighbor blocks on the right and on the bottom. In this example, information from block A is carried over to block B. As a result, during the decoding of block D, information from both block B (which are information from block A) and C are available as predictors to decode information of block D. In this example, it means 2 different motion vector predictors are potentially available as motion vector candidates for block D.

Table 1 gives an example of information which may be propagated from block to block and the associated mode. The motion information is composed of the motion vector and the reference index of the reference picture in the reference list, as well as the mode (unidirectional, bi-directional).

TABLE 1

| information | Associated mode |
| --- | --- |
| intra direction (IntraPredModeY in [2]) | CuPredMode ==MODE_INTRA && intra_mip_flag==false |
| Motion info | CuPredMode ==MODE_INTER |

TABLE 1-continued

| information | Associated mode |
|---|---|
| IBC motion vector | CuPredMode ==MODE_INTRA && pred_mode_ibc_flag == true |
| MIP mode | intra_mip_flag== true |
| GBI index (bcw_idx) | inter_pred_idc == PRED_BI |
| Affine model | inter_affine_flag == true |

Figures 8, 9:
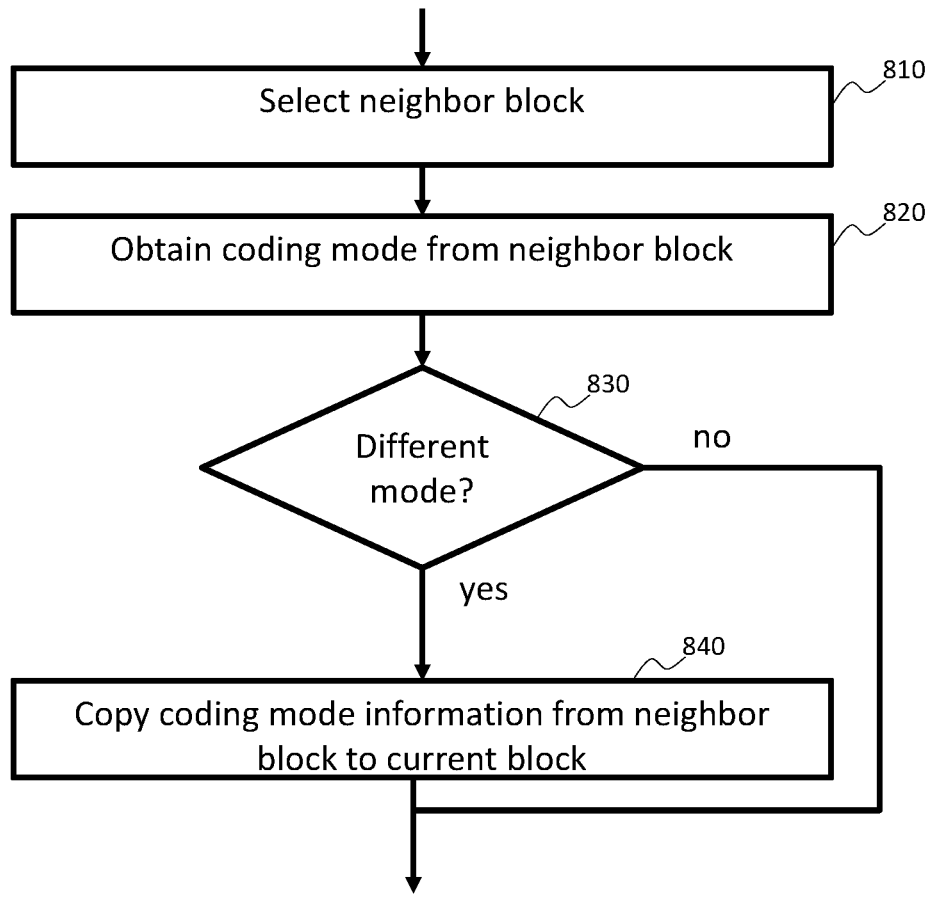
FIG. 8 illustrates an example embodiment to propagate relevant coding mode information from a current block to a neighbor block.
FIG. 9 illustrates examples of neighbors from which the coding mode information can be copied.

FIG. 8 illustrates an example embodiment to propagate relevant coding mode information from a current block to a neighbor block. This process is for example executed by the processor 301 of device 300 of FIG. 3, in an environment where the device 300 is used to implement the encoder 100 of FIG. 1 or a decoder 200 of FIG. 2. In step 810, the processor selects a neighbor block according one of the embodiments previously described. In step 820, the processor obtains the coding mode from the neighbor block and, in step 830, compares this mode to the mode of the current block. When the coding modes are different, then the neighbor block comprises coding mode information that could be interesting for the prediction of a further block and thus the coding mode information of the neighbor block are copied to the current block in step 840. Since the modes are different, the mode information is also different and thus the copy will not affect the normal operation for the current mode. Indeed, the copied information will not be used for the current block since related to another mode. However, this copied information may be used for a further block. When coding modes are the same (branch "no"), there is no need to copy the information since the current block already has the same information.

FIG. 9 illustrates examples of neighbors from which the coding mode information can be copied. A selection step (step 810 in FIG. 8) allows to choose from which neighbor block the coding mode information is to be copied, in other words it defines how the propagation is performed. In variant embodiments, the coding mode information for current block is copied from the left block, the right block, the top block, the bottom block, the top-left block, the top-right block, the bottom-left or the bottom right block.

In a variant embodiment, the coding mode information for current block is copied from the first available block among a set of blocks (for example an ordered list comprising top, left, top right, top left, etc.).

In a variant embodiment, the coding mode information for current block is copied from the last coded information. Each time a block is decoded, the current information of the block is updated in a table. Conversely, the information not related to the current block are copied from the table to the block. Optionally, the table can be reset after each CTU or line of CTU to prevent from propagating information too far away from their original block.

Some examples of propagation have been introduced hereabove, but other types of propagation are possible although not listed in this document.

Figure 10:
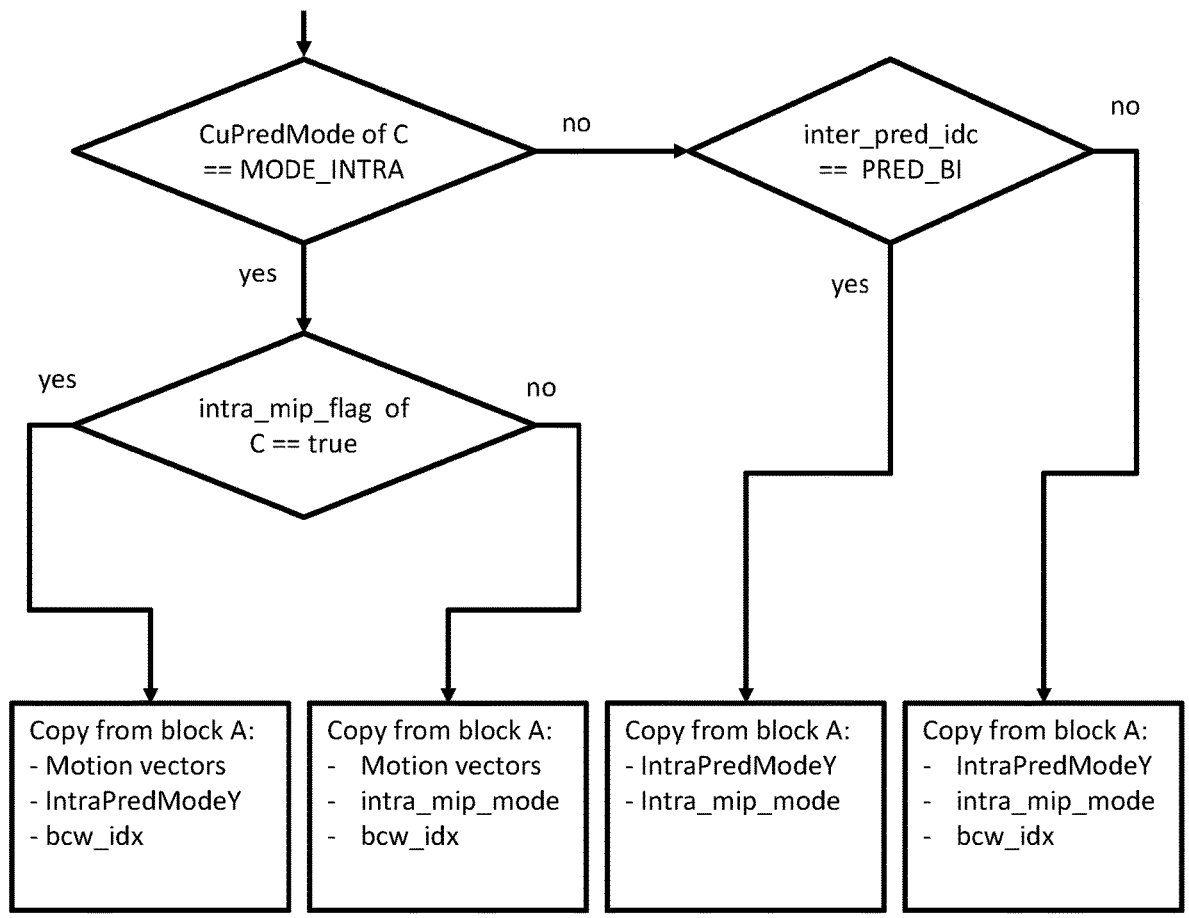
FIG. 10 illustrates an example of process designed to propagate relevant coding mode information from a current block to a neighbor block.

FIG. 10 illustrates an example of process designed to propagate relevant coding mode information from a current block to a neighbor block. The current block is denoted by C and the neighbor block is denoted by A. For the sake of simplicity, in this example, the affine mode is not taken into account and thus not illustrated. However, the same principles apply when using the affine mode.

For each of coding mode information, when the associated mode is not activated for the current block, then the corresponding information is copied over from the left neighbor. When the information is not available (for example on picture border or a slice border), then a default value is copied instead, as shown in Table 2.

TABLE 2

| information | Default value |
|---|---|
| intra direction | IntraPredModeY= INTRA_PLANAR |
| Motion information | Null vector, reference index 0 |
| IBC motion vector | Null vector |
| MIP mode | Index=0 |
| GBI index | Default GBI index (1/2, 1/2 weights) |
| Affine model | Null model |

This propagation of the coding mode information impacts the predictor derivation. Indeed, since all information are carried over from CU to CU (or set to default when not available), the availability test performed by conventional predictors becomes useless and can be removed from the predictor construction. For example, in the derivation process for luma intra prediction mode, if CuPredMode[0] [xNbX][yNbX] is not equal to MODE_INTRA then candIntraPredModeX is set to INTRA_PLANAR. This test can be removed since, even if the neighboring block is not in INTRA_MODE, necessary information (IntraPredModeY in this case) has been set. Other predictor derivation processes are similarly impacted. This simplifies the overall predictor construction process since some tests related to mode checking and value settings are no more needed thanks to the copy of the coding mode information from a neighbor block.

However, the propagation of the coding mode information it is not always desired and particularly over large areas. For that, in at least one embodiment, in order to limit the propagation of information on large area, the information is copied over from the neighboring block only in the case where this block has itself generated the relevant information. If this is not the case (information was copied), then the information is marked as unavailable, and default process for information availability (as described above) is restored. In this case, only a first generation propagation is authorized.

Figure 11:
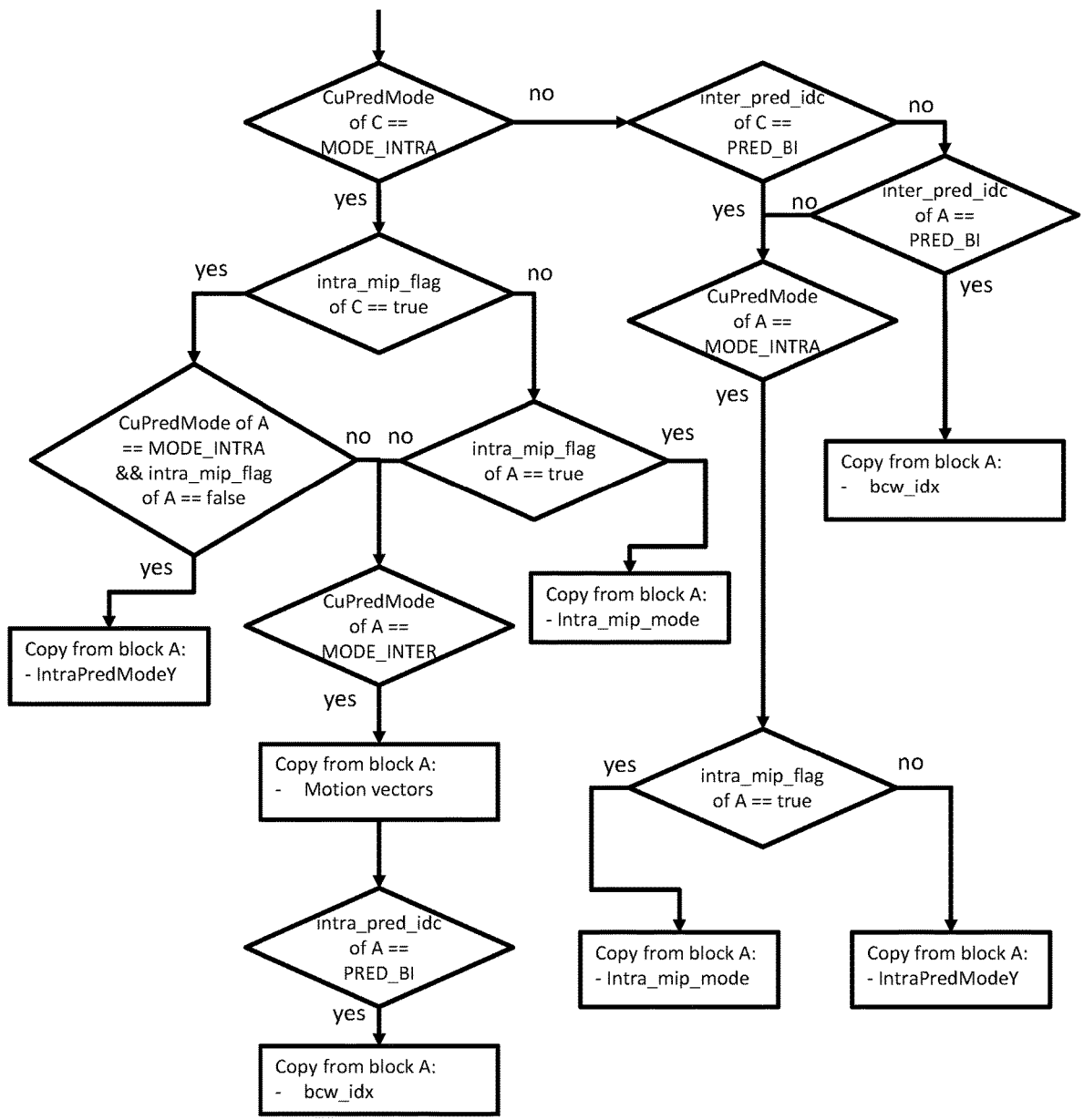
FIG. 11 illustrates an example embodiment where coding mode information is propagated from a neighbor block only when the neighbor block actually used the coding mode information.

FIG. 11 illustrates an example embodiment where coding mode information is propagated from a neighbor block only when the neighbor block actually used the coding mode information. In this example, the current block is denoted by C and the neighbor block is denoted by A. The process takes into account, for the possible modes of the current block, the mode actually used by the neighbor block and stores the relevant coding mode information issued from the neighbor block. For the sake of simplicity, in this example, the affine mode is not taken into account and thus not illustrated. However, the same principles apply when using the affine mode.

Figure 12:
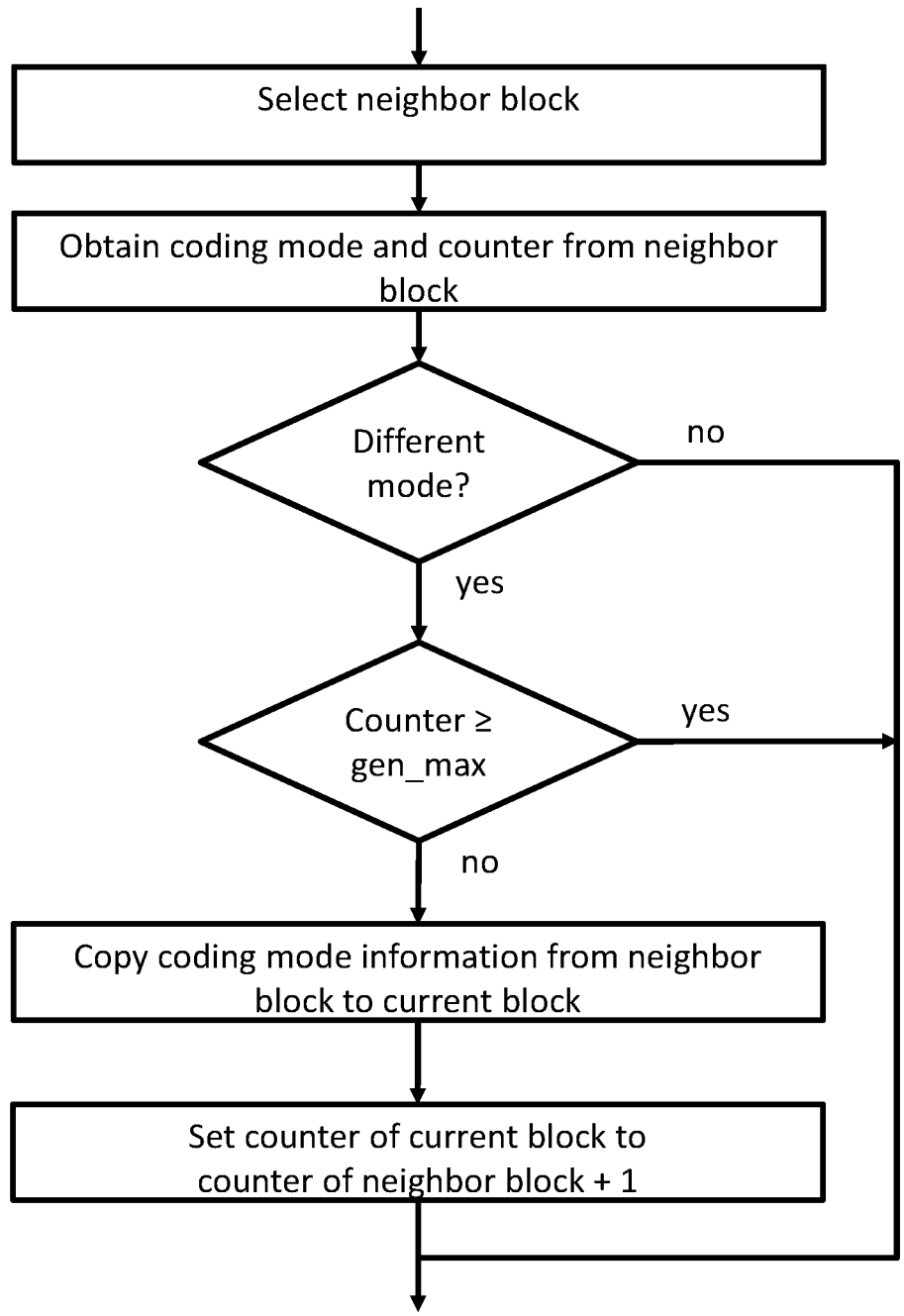
FIG. 12 illustrates an example embodiment where multiple generations of copies are allowed.

FIG. 12 illustrates an example embodiment where multiple generations of copies are allowed. This can be done by maintaining a counter to count the number of copies already done for a given coding mode information. This counter is incremented when making a copy and stored along with the associated coding mode information. This counter is compared with the desired number of generation gen_max. The copy is authorized while the counter stays below gen_max and not authorized when the counter becomes equal to gen_max. In a variant embodiment, a single generation propagation is authorized by setting gen_max to 1.

In at least an embodiment related to INTRA mode, since the planar mode is always the first MPM during the intra mode predictor construction list, the IntraPredModeY is propagated from the neighbor block when the mode of the current block IntraPredModeY is equal to INTRA_PLANAR.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, the embodiments presented in figures FIG. 8 or FIG. 10.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, the embodiments of figures FIG. 8 or FIG. 10.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well. The aspects described and contemplated in this application can be implemented in many different forms. Figures FIG. 1, FIG. 2 and FIG. 3 above provide some embodiments, but other embodiments are contemplated, and the discussion of Figures does not limit the breadth of the implementations.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example regarding block sizes. The specific values are for example purposes and the aspects described are not limited to these specific values.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory or optical media storage). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/of", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method comprising, for a current block of a picture:
   selecting a neighbor block; and
   copying coding mode information of the neighbor block to the current block, wherein a coding mode of the neighbor block is different from a coding mode of the current block and wherein the coding mode information is not used for the current block.

2. The method of claim 1, wherein the coding mode information from the neighbor block is not copied to the current block when the coding mode of the neighbor block is the same as the coding mode of the current block.

3. The method of claim 1, wherein the copied mode information from the neighbor block is used to perform prediction for a further block of the picture but not for the current block.

4. The method of claim 1, wherein the coding mode information comprises intra-direction information or motion information or motion vector or an affine model.

5. The method of claim 1, wherein the neighbor block is the block at the left of the current block or the block at the top of the current block or the block at the bottom of the current block or the block at the top-left of the current block.

6. The method of claim 1, wherein the neighbor block is the last block that was coded prior to the current block following a coding scan order.

7. The method of claim 1, wherein the neighbor block is the first available block among a set of blocks.

8. The method of claim 7, wherein the set of blocks is an ordered list comprising at least the block at the top of the current block, the block at the left of the current block, the block at the top right of the current block, the block at the top left of the current block.

9. The method of claim 1, wherein a counter is associated with the coding mode information to count the number of generations of the coding mode information, and wherein the copy of coding mode information is only allowed up to a maximum number of generations.

10. The method of claim 9, wherein the maximum number of generations is 1.

11. An apparatus comprising a processor configured to, for a current block of a picture:
    select a neighbor block; and
    copy coding mode information of the neighbor block to the current block, wherein a coding mode of the neighbor block is different from a coding mode of the current block and wherein the coding mode information is not used for the current block.

12. The apparatus of claim 11, wherein the coding mode information from the neighbor block is not copied to the current block when the coding mode of the neighbor block is the same as the coding mode of the current block.

13. The apparatus of claim 11, wherein the copied mode information from the neighbor block is used to perform prediction for a further block of the picture but not for the current block.

14. The apparatus of claim 11, wherein the coding mode information comprises intra-direction information or motion information or motion vector or an affine model.

15. The apparatus of claim 11, wherein the neighbor block is the block at the left of the current block or the block at the top of the current block or the block at the bottom of the current block or the block at the top-left of the current block.

16. The apparatus of claim 11, wherein the neighbor block is the last block that was coded prior to the current block following a coding scan order.

17. The apparatus of claim 11, further comprising a counter associated with the coding mode information to count the number of generation of the coding mode information, wherein the copy of coding mode information is only allowed up to a maximum number of generations.

18. The apparatus of claim 17, wherein the maximum number of generations is 1.

19. A non-transitory computer readable medium comprising program code instructions for implementing the method according to claim 1 when executed by a processor.

* * * * *